United States Patent [19]
Beekhuis

[11] 3,855,266
[45] Dec. 17, 1974

[54] PREPARATION OF GAMMA-CYANOBUTYRALDEHYDE

[75] Inventor: Gerrit E. Beekhuis, Geleen, Netherlands

[73] Assignee: Stamicarbon B.V., Geleen, Netherlands

[22] Filed: June 12, 1973

[21] Appl. No.: 369,390

[30] Foreign Application Priority Data
June 12, 1972 Netherlands.................. 7207939

[52] U.S. Cl........ 260/465.1, 260/583 N, 260/563 C
[51] Int. Cl........................................... C07c 121/02
[58] Field of Search................................ 260/465.1

[56] References Cited
UNITED STATES PATENTS

| | | | |
|---|---|---|---|
| 3,708,515 | 1/1973 | Thoma et al................. | 260/465.1 X |
| 3,686,262 | 8/1972 | Groen et al..................... | 260/465.1 |
| 3,337,603 | 8/1967 | Kato et al........................ | 260/465.1 |
| 3,318,911 | 5/1967 | Yoshida et al............... | 260/465.1 X |
| 3,270,044 | 8/1966 | Schmidtt et al............. | 260/465.1 X |
| 3,242,203 | 3/1966 | Noyori et al..................... | 260/465.1 |
| 2,768,962 | 10/1956 | Krimm..................... | 260/465.5 R X |

Primary Examiner—Joseph P. Brust
Attorney, Agent, or Firm—Cushman, Darby & Cushman

[57] ABSTRACT

A process for recovering γ-cyanobutyraldehyde from the acid hydrolysis mixture obtained by the acid hydrolysis of N-substituted γ-cyanobutyraldimine is disclosed, wherein the γ-cyanobutyraldehyde is extracted from such acid hydrolysis mixture with methyl ethyl ketone, nitromethane, dichloromethane, chloroform or 1,2-dichloroethane.

The extraction process of the present invention allows much lower amounts of solvents to be used than were used in previous prior art processes, and the γ-cyanobutyraldehyde is readily separated from the solvent.

9 Claims, No Drawings

PREPARATION OF GAMMA-CYANOBUTYRALDEHYDE

BACKGROUND OF THE INVENTION

The present invention relates to a process for preparing γ-cyanobutyraldehyde.

British Patent Specification No. 1,249,612 teaches that γ-cyanobutyraldehyde may be prepared by the acid hydrolysis of an N-substituted γ-cyanobutyraldimine. A hydrolysis mixture is obtained, containing the γ-cyanobutyraldehyde and a primary amine, wherein the substituent bound to the nitrogen atom of the amine is the same as the substituent on the nitrogen atom of the original aldimine. γ-cyanobutyraldehyde is recovered from the hydrolysis mixture by extraction.

The aforesaid British patent mentions benzene and toluene as the extracting agents for the extraction of γ-cyanobutyraldehyde. If these extracting agents are used, a rather large amount of such extracting agent is required, based on the amount of γ-cyanobutyraldehyde in the hydrolysis mixture. For instance, to extract 99 percent of the γ-cyanobutyraldehyde from a hydrolysis mixture containing 10 percent by weight of this compound, with the hydrolysis mixture subjected to a plurality of extraction steps with ether, with each extraction step using an amount of ether equal to the weight of the solution which is to be extracted, a total of 16 extraction steps must be conducted. If toluene or benzene is used in place of the ether, however, the necessary number of extraction steps are 9 and 8 times, respectively.

The use of other extracting agents, such as, for instance, chlorobenzene, ortho-dichlorobenzene, nitrobenzene, cyclohexane, cyclohexanol, carbon tetrachloride, tetrachloroethylene, 1,1-dichloroethane, 1,1,1-trichloroethane, trichloroethylene, anisole, ortho-nitroanisole, ethyl acetate, isoamyl ether, methyl isobutyl ketone, cyclohexanone, butyronitrile, benzonitrile, paracymeme, pseudocumene, Decalin, pentamethyl heptane, phenetole, benzofuran, metacresyl methyl ether and paracresyl methyl ether, again results in an extraction process wherein large amounts of the extracting agents are required. This has the undesirable result that for the recovery of γ-cyanobutyraldehyde by extraction, a relatively large extraction column is necessary, while the costs of recovery of the extracting agent, based on the amount of extracted γ-cyanobutyraldehyde, are significant.

For a given extraction agent to be suitable for the extraction of γ-cyanobutyraldehyde, several criteria should be met. The first, of course, the amount of extracting agent which is required to extract a given amount of γ-cyanobutyraldehyde should be less than the extracting agents mentioned above. Furthermore, the boiling point of the extracting agent should not be too high, as otherwise, recovery of the extracting agent by evaporation or distillation will be at an undesirably high temperature. Furthermore, the boiling points of the extracting agent and the γ-cyanobutyraldehyde (B.P. of 118°C at 30mm Hg) should not be too near each other, in order for a proper separation thereof to be obtained upon distillation.

DESCRIPTION OF THE INVENTION

The present invention involves the discovery that a few specific solvents are highly suitable for the extraction of γ-cyanobutyraldehyde from an acid hydrolysis mixture. These solvents may be used in much lower amounts than the solvents previously used by the prior art, and permit the ready separation therefrom from the extracted γ-cyanobutyraldehyde.

The solvents of the present invention are of the formula:

wherein X is hydrogen or Cl, Z is hydrogen or Cl, and Y is Cl or, when X is hydrogen and Z is Cl, Y may also be —CH$_2$Cl, or, when X and Z are both hydrogen, Y is nitro

Particular solvents falling within the above formula are methyl ethyl ketone, nitromethane, dichloromethane, chloroform, and 1,2-dichloroethane. Mixtures of these solvents may be used if desired.

The process of the present invention involves the extraction of γ-cyanobutyraldehyde from a hydrolysis mixture formed from the acid hydrolysis of a N-substituted γ-cyanobutyraldimine. An extracting amount of methyl ethyl ketone, dinitromethane, dichloromethane, chloroform or 1,2-dichloroethane is used to extract the γ-cyanobutyraldehyde mixture. It may be that the N-substituted γ-cyanobutyraldimine also contains some corresponding N-substituted crotonaldimine, so that crotonaldehyde is also present in the acid hydrolysis mixture. The crotonaldehyde may be removed by distillation prior to the extraction of the present invention, or the extraction may be conducted in the presence of the crotonaldehyde, in which case the cortonaldehyde, together with the γ-cyanobutyraldehyde, will be in the extract phase, from which it may be removed by distillation.

The extraction step of the process of the present invention may suitably be conducted at mild temperatures, for instance, between 15° and 60°C. However, higher and lower temperatures, e.g., 0° to 100°C, may be used if desired. The extraction pressure is not critical, and preferably the extraction is conducted at atmospheric pressure, although sub-atmospheric and super-atmospheric pressures may be used if desired.

The residue from the extraction step of the present invention is a water phase containing a primary amine salt, with the primary amine formed during the acid hydrolysis step. The salt solution may be treated with an alkali, such as, for instance, soda lye, calcium hydroxide or sodium carbonate, and then the amine may be extracted from the resulting solution, as described in the aforesaid British patent. Alternatively, however, the primary amine can suitably be recovered from the residue solution by distillation.

Normally, the extracting agent will be used in total volume which is less than 5 times the volume of the acid hydrolysis solution, and more preferably no more than about 4 times the volume of the acid hydrolysis solution. The volume of the extracting solution must be at least enough to extract the desired amount of γ-cyanobutyraldehyde, with the desired amount generally being about 99 percent of the γ-cyanobutyraldehyde in the hydrolysis mixture.

The acid hydrolysis mixture may be prepared by the process disclosed in the aforesaid British Patent Specification No. 1,249,612 or in the process of U.S. Pat. No. 3,708,515 the disclosures of which are hereby incorporated by reference for the teaching of the acid hydrolysis step therein. The N-substituent of the N-substituted γ-cyanobutyraldimine may suitable be an alkyl radical, including cycloalkyl radicals, of 1 to 10 carbon atoms.

The hydrolysis step may be conveniently conducted at room temperature, although temperatures of about 0° to about 50°C may be used if desired. The N-substituted γ-cyanobutyraldimine is hydrolized with at least a stoichiometric amount of a strong inorganic acid, such as, for instance, hydrochloric acid, sulphuric acid or nitric acid, diluted with at least such an amount of water that the salts formed will dissolve.

EXAMPLES OF THE INVENTION

The invention will be more readily understood with reference to the following examples, which are intended to illustrate, and not limit, the invention.

Example 1

Raw-N-cyclohexyl-γ-cyanobutyraldimine, having a purity of 87 percent by weight, was hydrolyzed with 1.7 N sulphuric acid at room temperature. 3.5 ml of the 1.7 N sulphuric acid was used per gram of starting raw material, and the resulting solution contained 9.1 percent by weight of γ-cyanobutyraldehyde.

1,000 grams of the acid hydrolysis solution were mixed in a 5-litre flask with 1,000 grams of methyl ethyl ketone, and the resulting mixture was vigorously stirred for about 20 minutes at 25°C. Thereafter, the aqueous phase was separated from the organic phase. The aqueous phase was then again treated with 1,000 grams of methyl ethyl ketone, using the procedure just described. This treatment was repeated two more times, so that a total of four treatments, using 1,000 grams of methyl ethyl ketone for each treatment, were used.

The four extracts were combined and the combined extracts, having a water content of about 10 percent by weight, were distilled at atmospheric pressure. Methyl ethyl ketone, partly in the form of an azeotrope with water, having a boiling range of 73°–78°C, was distilled, with the distillation residue containing 90.3 grams of γ-cyanobutyraldehyde, which indicates that 99 percent of the γ-cyanobutyraldehyde was extracted from the hydrolysis mixture. This residue was distilled at reduced pressure (0.2 mm Hg) producing 87 grams of γ-cyanobutyraldehyde, having a boiling point of 60°C at 0.2 mm Hg, and a purity of 98.3 percent.

The aqueous phase remaining after the last extraction treatment was treated with 200 millitres of an aqueous sodium hydroxide solution, containing 10 percent by weight of sodium hydroxide, until a pH of about 12 was reached, and thereafter a resulting solution was distilled at atmospheric pressure. The resulting aqueous distillate contained about 97 percent of the theoretical amount of cyclohexylamine.

Example 2

Example 1 was repeated, with 1,000 grams of the acid hydrolysis solution mixed in a 3-litre flask with 1,000 grams of chloroform, and the resulting mixture was vigorously stirred for 15 minutes at 25°C. The water phase was then separated from the extract and this aqueous phase was then subjected to 3 additional extraction treatments, for a total amount of 4 treatments with 1,000 grams of chloroform used in each treatment.

After the extracts had been combined and distilled at atmospheric pressure, chloroform, having a boiling point of 59°–60°C, was recovered. The distillation residue contained 90.2 grams of γ-cyanobutyraldehyde, from which it can be readily calculated that about 99 percent of the γ-cyanobutyraldehyde was extracted from the acid hydrolysis mixture.

Example 3

Example 1 was repeated, except that dichloromethane was used as the extracting agent. 99 percent of the γ-cyanobutyraldehyde in the acid hydrolysis mixture was recovered after extracting the hydrolysis mixture 4 times with 1,000 grams of dichloromethane used for each extraction step.

Example 4

Example 1 was repeated, except 1,2-dichloroethane was used as the extracting agent. The same results were achieved with the extraction treatment being conducted for a total of 4 times.

Example 5

Example 3 was repeated, using nitromethane as the extracting agent. The same results were obtained as in Example 3, using a total of 3 extraction treatment steps.

Comparative Examples

Example 3 was repeated, using ether, benzene and toluene in separate tests as extracting agents. In order to recover 99 percent of the γ-cyanobutyraldehyde in the acid hydrolysis mixture, it was necessary for the extraction treatment to be conducted for 16 steps in the case of ether, 8 steps in the case of benzene, and 9 steps in the case of toluene.

In order to recover only 95 percent of the γ-cyanobutyraldehyde, the extraction treatment had to be conducted a total of 10 steps in the case of ether, 5 steps in the case of benzene, and 6 steps in the case of toluene.

I claim:

1. A process for recovering γ-cyanobutyraldehyde from the acid hydrolysis mixture obtained by the acid hydrolysis of an N-substituted γ-cyanobutyraldimine, wherein the N-substituent is an alkyl group of 1 to 10 carbon atoms, said hydrolysis forming the corresponding amine and said γ-cyanobutyraldehyde, said process comprising extracting γ-cyanobutyraldehyde from the acid hydrolysis mixture using an extracting amount of at least one extracting agent of the formula

Wherein:
X=H or Cl
Z=Cl or H

Y=Cl or, when X is H and Z is Cl, Y may also be —CH$_2$Cl, or, when X and Z are H, Y is nitro or

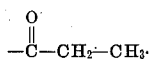

2. The process according to claim 1, wherein said extracting agent is methyl ethyl ketone.

3. The process according to claim 1, wherein said extracting agent is nitromethane.

4. The process according to claim 1, wherein said extracting agent is dichloromethane.

5. The process accordi to claim 1, wherein said extracting agent is chloroform.

6. The process according to claim 1, wherein said extracting agent is 1,2-dichloroethane.

7. Process according to claim 1, wherein the total volume of extracting agent is less than 5 times the volume of the acid hydrolysis solution.

8. Process according to claim 1 wherein said extracting agent is selected from the group consisting of methyl ethyl ketone, nitromethane, dichloromethane, chloroform, and 1,2-dichloroethane.

9. Process according to claim 1, including the additional step of recovering the primary amine from the aqueous solution remaining after the extraction with said extracting agent by alkalizing said solution with at least a stoichiometric amount of an alkaline material, and thereafter distilling said alkalized solution.

* * * * *